(12) United States Patent
Holland et al.

(10) Patent No.: US 9,759,585 B2
(45) Date of Patent: Sep. 12, 2017

(54) TDM- AND WDM-BASED FBG SENSOR ARRAY SYSTEM

(71) Applicant: OFS Fitel, LLC, Norcross, GA (US)

(72) Inventors: William R Holland, Upper Black Eddy, PA (US); Yaowen Li, Princeton, NJ (US); Jeffrey W Nicholson, Warren, NJ (US); Yingzhi Sun, Somerset, NJ (US); Benyuan Zhu, Princeton, NJ (US)

(73) Assignee: OFS FITEL, LLC, Norcross, GA (US)

( * ) Notice: Subject to any disclaimer, the term of this patent is extended or adjusted under 35 U.S.C. 154(b) by 111 days.

(21) Appl. No.: 14/381,662

(22) PCT Filed: Mar. 4, 2013

(86) PCT No.: PCT/US2013/028871
§ 371 (c)(1),
(2) Date: Aug. 28, 2014

(87) PCT Pub. No.: WO2013/131085
PCT Pub. Date: Sep. 6, 2013

(65) Prior Publication Data
US 2016/0011018 A1    Jan. 14, 2016

Related U.S. Application Data

(60) Provisional application No. 61/605,902, filed on Mar. 2, 2012.

(51) Int. Cl.
*G01B 9/02* (2006.01)
*G01N 21/00* (2006.01)
(Continued)

(52) U.S. Cl.
CPC ......... *G01D 5/35364* (2013.01); *G01K 11/32* (2013.01)

(58) Field of Classification Search
CPC .......... G01D 5/35383; G01D 5/35316; G01D 5/35364; G01H 9/004; G01L 1/246; G01L 11/025; G01K 11/3206; G01K 11/32
(Continued)

(56) References Cited

U.S. PATENT DOCUMENTS 6,621,960 B2 *  9/2003  Wang ................. G02B 6/02138
                                                    385/37
2004/0066550 A1 *  4/2004  Jay ........................ H01S 3/0057
                                                    359/337.1
(Continued)

OTHER PUBLICATIONS

Lee et al., Raman amplifier based long distance remote strain and temperature sensing system using an erbium-doped fiber and a fiber Bragg grating. optics Express vol. 12. No. 15, Jul. 26 1004 pp. 3515-3520.*

*Primary Examiner* — Sunghee Y Gray
(74) *Attorney, Agent, or Firm* — Jacobs + Kim LLP (57) ABSTRACT

In a TDM- and WDM-based FBG sensor array system, a source emits a light covering a selected wavelength range. The light is amplified and then used to generate a series of pulses that are fed into an array of sensor gratings. The propagation of a pulse through the sensor array results in a time-domain-multiplexed output, comprising a series of output pulses in which each output pulse comprises a reflection of the input pulse at a respective grating in the sensor array. Raman amplification is used to amplify both the pulse input into and the time-domain multiplexed output from the sensor array, which is then coupled into an output processing stage for receiving the sensor output and for reconstructing the wavelength output of each grating in the sensor array. The wavelength change for each grating is then used to calculate a physical parameter(s) to be measured, such as temperature and/or strain.

18 Claims, 6 Drawing Sheets

(51) Int. Cl.
*G02B 6/26* (2006.01)
*G01D 5/353* (2006.01)
*G01K 11/32* (2006.01)

(58) Field of Classification Search
USPC .......................... 356/478, 477, 73.1; 385/32
See application file for complete search history.

(56) References Cited

U.S. PATENT DOCUMENTS

| | | | |
|---|---|---|---|
| 2009/0046276 A1* | 2/2009 | Moore | G02B 6/2932 |
| | | | 356/73.1 |
| 2009/0202196 A1* | 8/2009 | Kish, Jr. | B82Y 20/00 |
| | | | 385/14 |
| 2010/0103426 A1* | 4/2010 | Kim | G01J 3/02 |
| | | | 356/446 |

* cited by examiner

| | Gratig reflectivity (r) | t | Number of gratings (i) | reflection from ith grating |
|---|---|---|---|---|
| | 0.002 | 0.998 | 300 | 0.0006 |
| in dB | -27 | | | -32 |
| | 0.001 | 0.999 | 500 | 0.00037 |
| in dB | -30 | | | -34.4 |
| | 0.0005 | 0.9995 | 1000 | 0.00018 |
| in dB | -33 | | | -37.3 |
| | 0.0002 | 0.9998 | 2000 | 0.00009 |
| in dB | -37 | | | -40.5 |
| | 0.0001 | 0.9999 | 3000 | 0.000055 |
| in dB | -40 | | | -42 |
| | 0.0001 | 0.9999 | 5000 | 0.000037 |
| in dB | -40 | | | -44.3 |

TDM- AND WDM-BASED FBG SENSOR ARRAY SYSTEM

CROSS REFERENCE TO RELATED APPLICATIONS

The present application claims the priority benefit of the following United States provisional patent application, which is owned by the assignee of the present application, and which is incorporated herein by reference in its entirety: U.S. Prov. Pat. App. Ser. No. 61/605,902, filed on Mar. 2, 2012.

BACKGROUND OF THE INVENTION

Field of the Invention

The present invention relates generally to the field of fiber optics, and in particular to an improved time domain multiplexing (TDM) and wavelength division multiplexing (WDM) based FBG sensor array system.

Background Art

A typical fiber optic sensor may comprise an array of sensing elements, located at respective sensing points, such that each generates a respective optical output that varies in response to changes in temperature and/or strain. One popular type of fiber optic sensor uses fiber Bragg gratings (FBGs) as sensing elements. An FBG is an in-fiber optical device that reflects light at a known wavelength (i.e., the "Bragg wavelength") that shifts in response to changes in temperature and/or strain. In an FBG sensor system, a broadband input laser beam is coupled into an array of FBGs. The output of the sensor array (i.e., the light reflected back from the FBGs) is then coupled into an output processing stage, which uses the sensor output to derive precise measurement data.

One significant advantage of using FBGs as sensing elements is that they lend themselves to multiplexing. Outputs from all of the FBGs in a sensor array can be transmitted to the output processing stage over a single optical fiber pathway. The output processing stage then reconstructs the output of each individual FBG in the sensor array. The wavelength change for each grating is then used to calculate the physical parameter(s) to be measured, such as temperature and/or strain. The output data can be multiplexed in different ways.

A wavelength division multiplexing (WDM) can be used to multiplex an optical signal in the wavelength domain. In a WDM-based sensor system, the FBG sensor array is configured such that each individual FBG provides an output within a unique, non-overlapping wavelength range. Thus, the respective contribution of each FBG to the multiplexed signal is identifiable by wavelength. WDM-based designs are widely used for a number of reasons, including the fact that the technology is well established, straightforward and easy to implement.

Alternatively, a time domain multiplexing (TDM) technique can be used to multiplex an optical signal in the time domain. In a TDM-based sensor system, the input into the sensor array comprises a series of discrete pulses. The individual FBGs within the array are spaced apart, such that the response of each successive FBG to an input pulse is delayed by a duration in time greater than the duration of the input pulse. Thus, when an input pulse propagates through the sensor array, an output signal is generated that comprises a series of pulses, each generated by the partial reflection of the input pulse by a respective FBG. The output processing stage can then use the arrival time of an output pulse to determine which FBG in the sensor array was the source of that particular pulse.

Conventional multiplexing techniques are proving to be inadequate for today's most demanding applications. In some fields, such as civil engineering, applications are calling for increasing numbers of sensing points over greater and greater distances. For example, a civil engineering application may call for thousands of sensing points over a 10 km span.

A conventional WDM-based sensor system is incapable of providing such a large number of sensing points. As discussed above, a WDM-based sensor requires each individual FBG in the sensor array to operate within a unique, non-overlapping wavelength range. Thus, an application calling for thousands of sensing points would require a wavelength range exceeding the capacity of current systems.

Conventional TDM-based systems are also problematic, but for different reasons. As mentioned above, in a TDM-based system, individual FBG outputs are identified by their arrival time rather than by their wavelength. Thus, wavelength range is not an issue. However, in a sensor system with thousands of sensor gratings, the output processing stage has to be able to robustly and accurately reconstruct the short pulse and wavelength response of each FBG in the sensor array from a received sensor output having a frequency on the order of $10^8$ Hz or faster. Thus, it is desired to have a sensor and/or a sensor system that can meet such demands.

SUMMARY OF THE INVENTION

An aspect of the invention is directed to a TDM- and WDM-based FBG sensor array system, in which a source emits a light covering a selected wavelength range. The light is amplified and then used to generate a series of pulses that are fed into an array of sensor gratings. The propagation of a pulse through the sensor array results in a time-domain-multiplexed output, comprising a series of output pulses in which each output pulse comprises a reflection of the input pulse at a respective grating in the sensor array. Raman amplification is used to amplify both the pulse input into, and the time-domain multiplexed output from the sensor array. The TDM output is then coupled into an output processing stage for receiving the sensor output and for reconstructing the wavelength output of each grating in the sensor array. The wavelength change for each grating is then used to calculate the physical parameter(s) to be measured, such as temperature and/or strain.

According to a further aspect of the invention, the sensor array comprises gratings belonging to two or more groups, each group characterized by a respective Bragg wavelength, such that the sensor array output is multiplexed in both the time and wavelength domains.

DETAILED DESCRIPTION

The present invention is directed to a robust TDM- and WDM-based FBG sensor array system for accurate strain and/or temperature measurements with tens of thousands, or hundreds of thousands, of sensing points.

Figure 1:
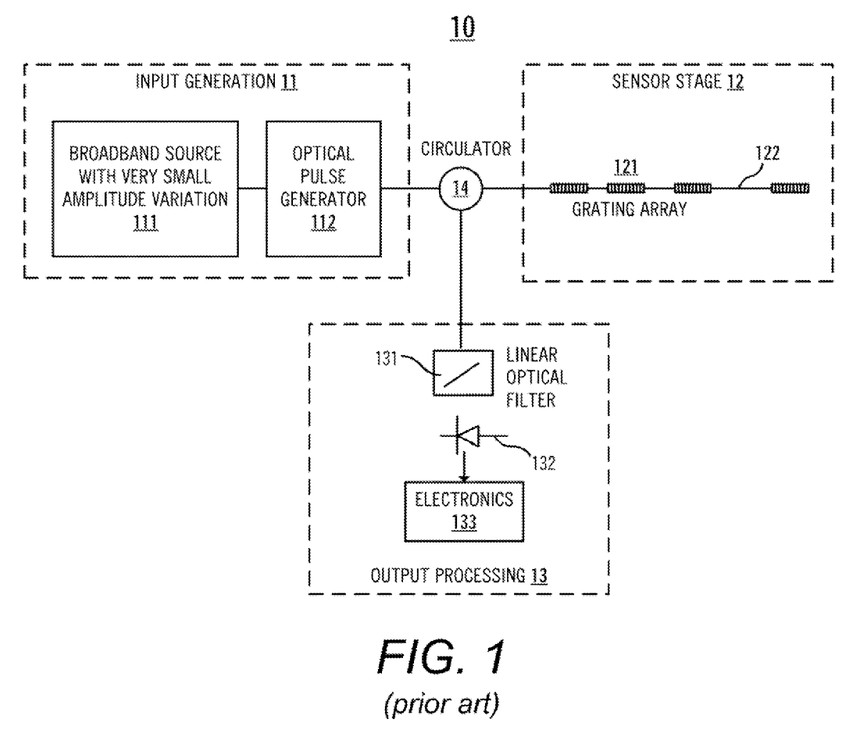
FIG. 1 is a diagram illustrating a TDM-based interrogation system according to the prior art.

FIG. 1 is a diagram illustrating a TDM-based interrogation system 10 according to the prior art, which is described briefly in order to provide context for the present discussion. System 10 comprises three stages: an input generation stage 11, a sensor stage 12, and an output processing stage 13. The three stages are connected together by means of an optical circulator 14, which couples the input light generated by the first stage 11 into the second stage 12, and which couples the sensor output from second stage 12 into the third stage 13.

The input generation stage 11 comprises a laser source 111 emitting a broadband laser light that is converted into a series of pulses by an optical pulse generator 112. The generated pulses are then coupled via circulator 14 into the sensor stage 12.

The sensor stage 12 comprises an array of sensor gratings 121 written into an optical fiber 122. The sensor gratings 121 are spaced apart such that when an input pulse travels through the sensor array, an output signal is generated comprising a sequential chain of individual pulses. Each output pulse comprises a partial reflection of the input pulse by a respective sensor grating. The output signal travels back to circulator 14, which couples the output signal into the output processing stage 13.

Output processing stage 13 comprises a linear optical filter 131, a high-speed detector 132, and associated electronics 133 for deriving wavelength data from the output signal. The purpose of linear optical fiber 131 is to convert the wavelength shifts at each grating in the sensor array into variations in optical power. For the filter 131, if the input to it has constant amplitude, but a varying wavelength, the relationship between the transmission amplitude and wavelength is linear. Thus, each pulse in the generated output signal has a unique amplitude that can be related to a respective wavelength through calibration.

It can be seen that system 10 requires a broadband source 111 without amplitude variation, both with respect to time and wavelength as any amplitude fluctuation in the source will cause measurement errors. Further, fluctuations in amplitude, which can arise for example as a result of link insertion loss variation by other external factors, such as fiber bending, would also produce measurement errors.

A series of calculations were performed in order to better understand the behavior of a sensor array having a large number of gratings.

Figure 2:
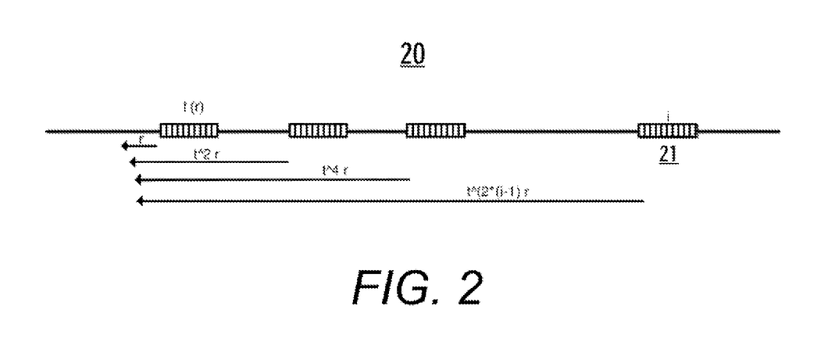
FIG. 2 is a diagram illustrating the calculation of grating reflection for each FBG in a sensor array.

FIG. 2 is a diagram illustrating how to calculate the grating reflection for each FBG in a sensor array 20 in which all of the individual gratings 21 have the same Bragg wavelength, the same reflection coefficient r, and the same transmission coefficient t. In this case, the amount of reflected light for a given sensor grating, $t_i$, is equal to the following:

$$t^{2(i-1)}r.$$

Figure 3:
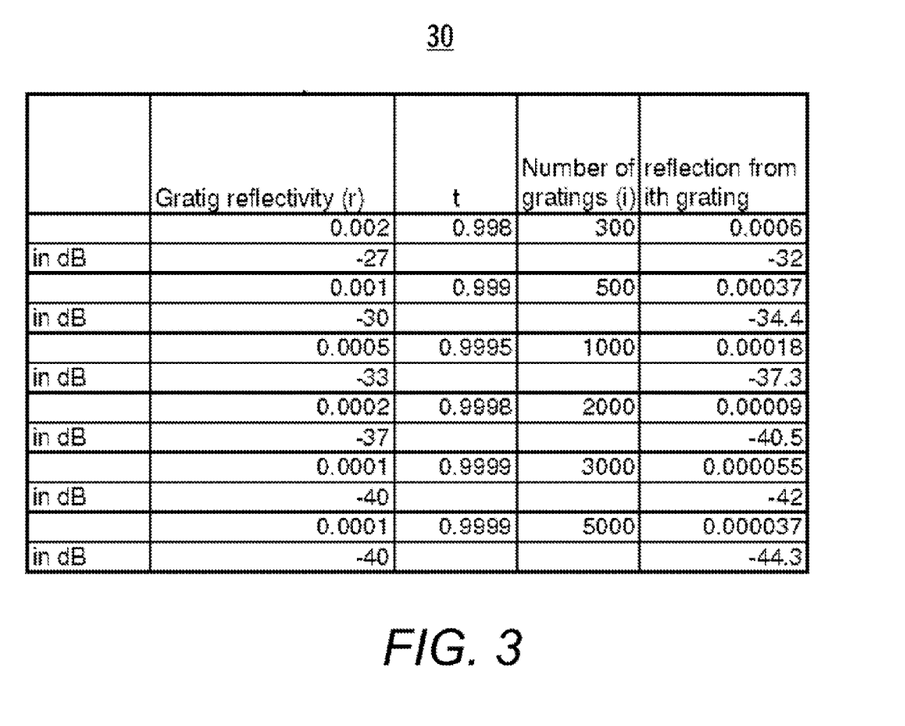
FIG. 3 is a table summarizing the results of the calculation illustrated in FIG. 2.

FIG. 3 shows a table 30 summarizing the results of the calculation for grating reflectivities ranging from 0.002 to 0.0001, transmission constants ranging from 0.998 to 0.9999, and for a number of gratings i ranging from 300 to 5,000. It can be seen that for 1,000 gratings with the same wavelength, assuming a 0 dB input, a grating reflectivity of 0.005, and a transmission constant of 0.9995, the signal from the last grating in the sensor array (i.e., the last pulse to reach the input point) is approximately −37.3 dB. For 5,000 gratings with the same wavelength, assuming a 0 dB input, a grating reflectivity of 0.0001, and a transmission constant of 0.9999, the signal from the last grating in the sensor array is approximately −45 dB. Thus, the results of the reflectivity calculation set forth in table 30 indicate that by carefully designing the amplification schemes, choosing suitable detector and electronics, and implementing some noise reduction algorithms, it is possible to detect the signals from weak reflective gratings in an array comprising 1,000 individual FBGs, and possibly even in an array comprising in 5,000 gratings, with a good optical signal-to-noise ratio (OSNR).

According to a further aspect of the invention, WDM is used in conjunction with TDM to increase the number of FBGs in a sensor array. It is possible to add a second group of 1,000 or 5,000 additional gratings having a wavelength that is different from that of the first group of gratings, as long as the wavelengths of the two groups do not overlap. Because reflectivity is wavelength-dependent, one group of gratings will not have a significant effect on the light input to another group of gratings.

It is noted that a sensor array comprising a plurality of wavelength-defined groups of gratings can be configured in a number of different ways. For example, the groups can be arranged in a non-overlapping sequence. Alternatively, individual gratings from different groups can be arranged in an alternating pattern or in some other kind of overlapping configuration. In these ways, the distance between at least some adjacent gratings with the same wavelength can exceed a required distance between adjacent sensing points. This increased distance, in turn, allows a wider input pulse to be used, thereby alleviating the burden on system electronics.

Thus, in a fiber optic system according to the present invention, the number of gratings can be expanded into the thousands. If a particular application allows the use of additional gratings at further wavelengths different from the first and second group, the number of sensing points could potentially expand into the tens of thousands, or even hundreds of thousands.

Figure 4:
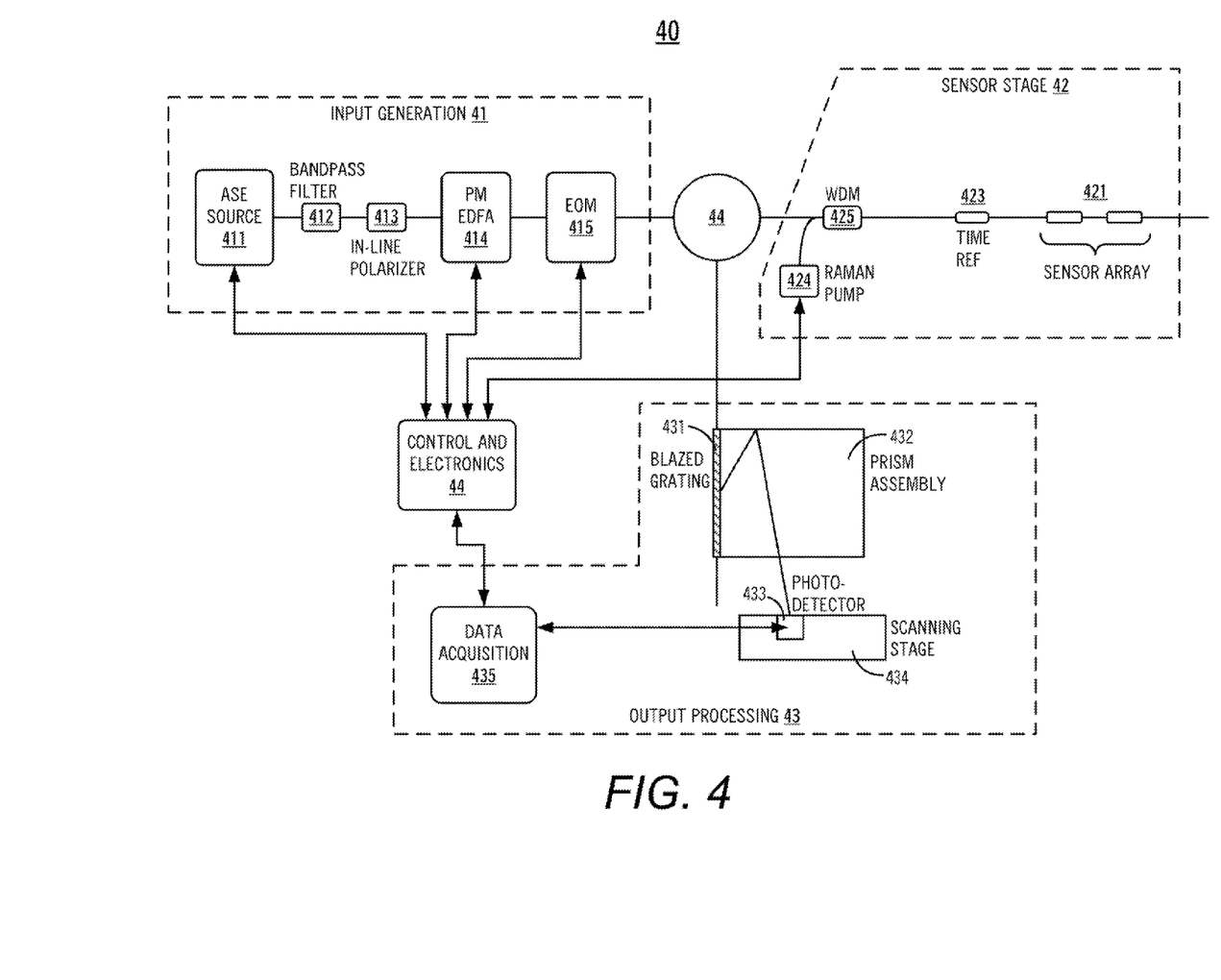
FIGS. 4-7 are diagrams of exemplary fiber optic sensor systems according to aspects of the invention.
Figure 5:
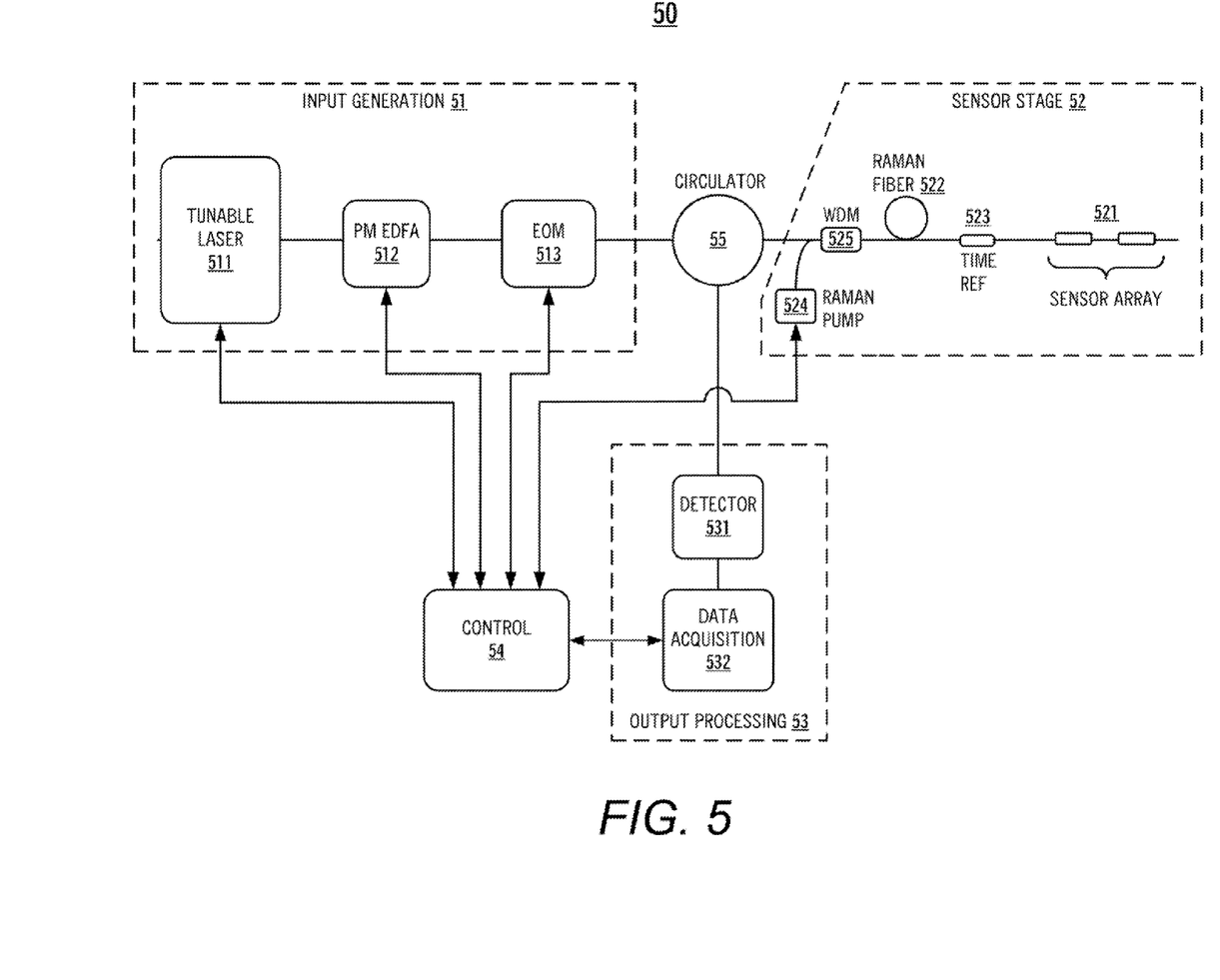
Figure 6:
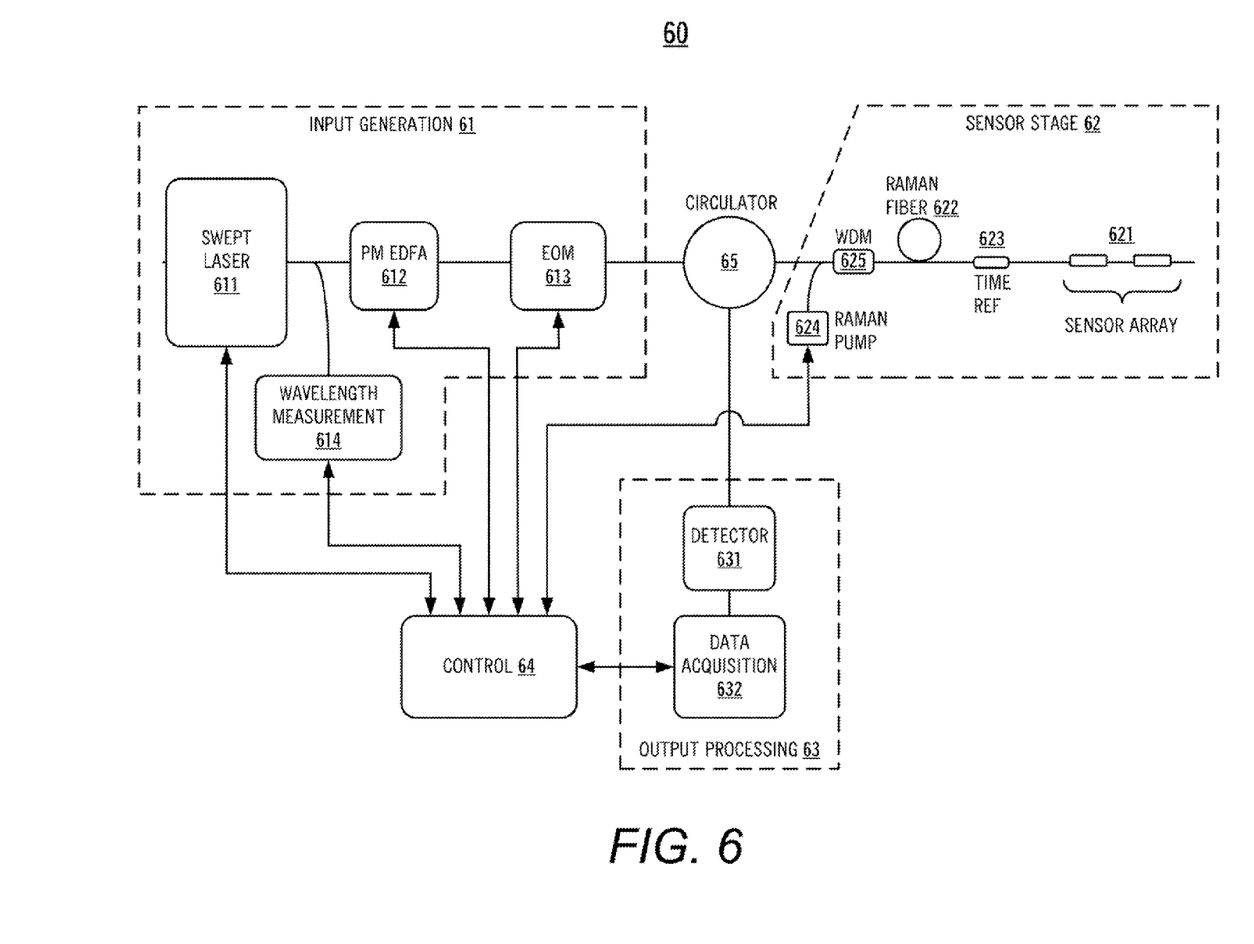

FIGS. 4, 5, and 6 are diagrams of exemplary systems 40, 50, 60 according to the present invention that are able to accommodate a large number of sensor gratings (i.e., in the hundreds, thousands, and beyond) while maintaining robust and accurate performance. The algorithms underlying these systems are based on the respective type light source in the input generation stage: an amplified spontaneous emission (ASE) source (FIG. 4), a tunable laser (FIG. 5), and a swept laser (FIG. 6). All three systems employ erbium-doped fiber amplifiers (EDFAs) in conjunction with Raman amplification schemes to achieve a large number of sensing FBG points. Other amplification schemes or amplifications at different signal locations may also be used to achieve the same goals.

FIG. 4 shows a diagram of an ASE-source-based system 40 according to an aspect of the invention. System 40 comprises three stages: an input generation stage 41, a sensor stage 42, and an output processing stage 43. The three stages are operated by a control module 44 that includes a processing unit and control-related electronics. The three stages are connected together by means of an optical circulator 45. Light from the input generation stage 41 is coupled into in the sensor stage 42. The light output of the sensor stage 42 is coupled into the output processing stage 43.

The input generation stage 41 comprises a broadband amplified spontaneous emission (ASE) source 411. Light emitted by ASE 411 is filtered by bandpass filter 412 and in-line polarizer 413, and is then amplified by a polarization-maintaining, erbium-doped fiber amplifier (PM-EDFA) 414, or other rare-earth-doped fiber amplifier. Electro-optic modulator (EOM) 415 then modulates the amplified ASE light so as to produce a series of optical pulses that are coupled into the sensor stage 42 by means of circulator 45.

Sensor stage 42 comprises a sensor array 421 comprising hundreds (or thousands) of individual FBGs at designated locations along the length of a single optical fiber pathway 422. The spacing between adjacent gratings in sensor array 421 is configured to result in a predetermined amount of delay between the respective outputs of each individual grating. The pulses generated by the input generation stage are configured to have a duration that is less than this output delay and the pulse period is determined by the time for the last grating to reflect the light. Thus, the propagation of an input pulse through the sensor array results in an output comprising a chain of pulses, each pulse generated by the partial reflection of the input pulse by a respective individual grating at the grating's Bragg wavelength.

A weakly reflecting broadband grating 423 is positioned along the sensor stage optical pathway, upstream of the sensor array 421. Light reflected back from the broadband grating 423 is used to provide a baseline time reference used to ascertain the arrival time of each pulse in the output data stream. It is noted that if the sensor array is configured to include two or more wavelength-defined groups of sensor gratings, this time reference grating may be designed so that it covers all the groups of sensor gratings.

Raman pump 424 and wavelength-division multiplexer (WDM) 425 provide flat, low-noise Raman amplification for the light launching into the grating array and the light reflected back by the sensor array. Using Raman amplification here has multiple advantages, including: (1) improved amplification of a low-duty cycle optical pulse signal; (2) it is bidirectional; thus, forward and backward signals are both amplified; (3) the sensing fiber itself can be part of Raman amplification process. Through the combined use of PM-EDFA 414 to amplify the input light and Raman amplification to amplify the input and the output of the sensor array, it is possible to attain a good optical signal-to-noise ratio from sensor array 421, even where the number of sensor gratings is in the hundreds, thousands, or even greater. Further, depending upon the needs of a particular application, it would be possible to use a Raman-active fiber for a portion of, or the full length of, the sensor fiber pathway 422 in order to provide additional Raman amplification. The sensor output is fed into circulator 45, which couples the output into the output processing stage 43.

The output processing stage 43 comprises a detection scheme that provides robust and accurate measurements of the wavelength of each grating in the sensor array 421. The sensor output first undergoes wavelength spreading, which is accomplished by sending the output pulse chain to a blazed grating 431 and through a prism assembly 432. It is noted that other means known in the art could be used to spread the light before detection. The main advantage of the described system is that it is robust and inexpensive.

The wavelength-spread pulse is then fed into a photodetector 433 mounted onto a scanning stage 434, which is connected to a data acquisition module 435. The scanning stage is calibrated such that wavelength data for an output pulse can be accurately derived from the positioning of the spread pulse on the scanning stage, and by providing data acquisition module 435 with suitable analog-to-digital (A/D) electronics. Accuracy in the detection of a high-frequency pulse chain depends upon the speed of the photodetector 433 and the subsequent A/D conversion.

To provide a general concept with respect to the type of detector and electronics that are required for the output processing stage 43, there is now considered an exemplary sensor system having a sensor array comprising 1,000 gratings separated from each other by a distance of one meter and with same wavelength. At that distance, the time difference between the light reflected by each successive grating is approximately 10 ns.

In the exemplary sensor, a single input pulse propagating through the sensor array will generate an output comprising 1,000 pulses spread out over 10 microseconds. Each pulse corresponds to a respective individual sensor grating.

In order to avoid overlap, the input pulse must have a pulse width (i.e., duration) that is less than 10 ns. In the exemplary sensor system being considered, it is assumed that the input pulse width is 8 ns, which corresponds to a detection frequency of 125 MHz. Thus, in this case, the photodetector 433 must have a capacity of 125 MHz or greater. The analog-to-digital (A-to-D) converter used to digitize the pulse signal must have a maximum frequency capacity that is at least twice the maximum frequency of the detected signal, i.e., 250 MHz or greater.

One notable difference between system 40 and the prior art system 10 (FIG. 1), discussed above, is that the input generation stage 41 of system 40 can have significantly looser amplitude stability requirements, both with respect to time and wavelength ranges. System 10 is intensity-based. Thus, amplitude stability is a critical component in obtaining accurate measurement data. In system 40, on the other hand, measurements are wavelength-based. Thus, maintaining little variation in amplitude, as required in system of FIG. 1, is not as significant.

FIG. 5 shows a diagram of a system 50 according to a further practice of the invention, in which the light source is a tunable laser 511 with accurate wavelength setting. System 50 comprises three stages: an input generation stage 51, an output stage 52, and an output processing stage 53. The three stages are operated by a control module 54 that includes a processing unit and control-related electronics. The three stages are connected together by means of an optical circulator 55. Light from the input generation stage 51 is coupled into the sensor stage 52. The light output of the sensor stage 52 is coupled into the output processing stage 53.

Input generation stage 51 comprises tunable laser 511, PM-EDFA 512, and EOM 513. Sensor stage 52 comprises the same configuration as sensor stage 42 (FIG. 4), including sensor array 521, Raman fiber 522, time reference grating 523, Raman pump 524, and WDM 526. Output processing stage 53 comprises a high-speed detector 531, which feeds data into data acquisition module 532.

The components of system 50 generally correspond to those of system 40, with modifications arising from the use of a different broadband source. One difference is that in system 50, wavelength data from the sensor output can be derived in relationship to the instantaneous wavelength of the output of tunable laser 511, which can be taken directly from the laser setting. Thus the output from the sensor stage 52 can be provided as a direct input into detector 531 in the output processing stage 53, as opposed to going through wavelength spreading as shown in FIG. 4. Although a tunable laser may give a higher cost to the system 50 compared to system 40 shown in FIG. 4, system 50 requires fewer components.

FIG. 6 shows a diagram of a system 60 according to a further practice of the invention, in which the broadband light source is implemented using a swept laser 611 without accurate wavelength output and control. System 60 comprises three stages: an input generation stage 61, a sensor stage 62, and an output processing stage 63. The three stages are operated by a control module 64 that includes a processing unit and control-related electronics. The three stages are connected together by means of an optical circulator 65. Light from the input generation stage 61 is coupled into the output stage 62. The light output of the sensor stage 62 is coupled into the output processing stage 63.

Input generation stage 61 comprises swept laser 611, PM-EDFA 612, and EOM 613. Because swept laser 611 may not have the required wavelength accuracy and consistency, input generation stage 61 further includes a wavelength measurement module 614 that is used to measure the instantaneous wavelength of the swept laser output for use by the control module 64 in the wavelength calculations.

The remaining components of system 60 are the same as the corresponding components of system 50 shown in FIG. 5. Sensor stage 62 comprises a sensor array 621 with a large number of gratings written into a Raman fiber 622. A time reference grating 623 is provided upstream of the sensor array 621. The sensor grating output is amplified by Raman-pumped WDM 625 (pumped by Raman pump 624) and then fed into circulator 65 that couples the output into the output processing stage 63. Output processing stage 63 comprises a high-speed detector 631, which feeds data into data acquisition module 632.

Figure 7:
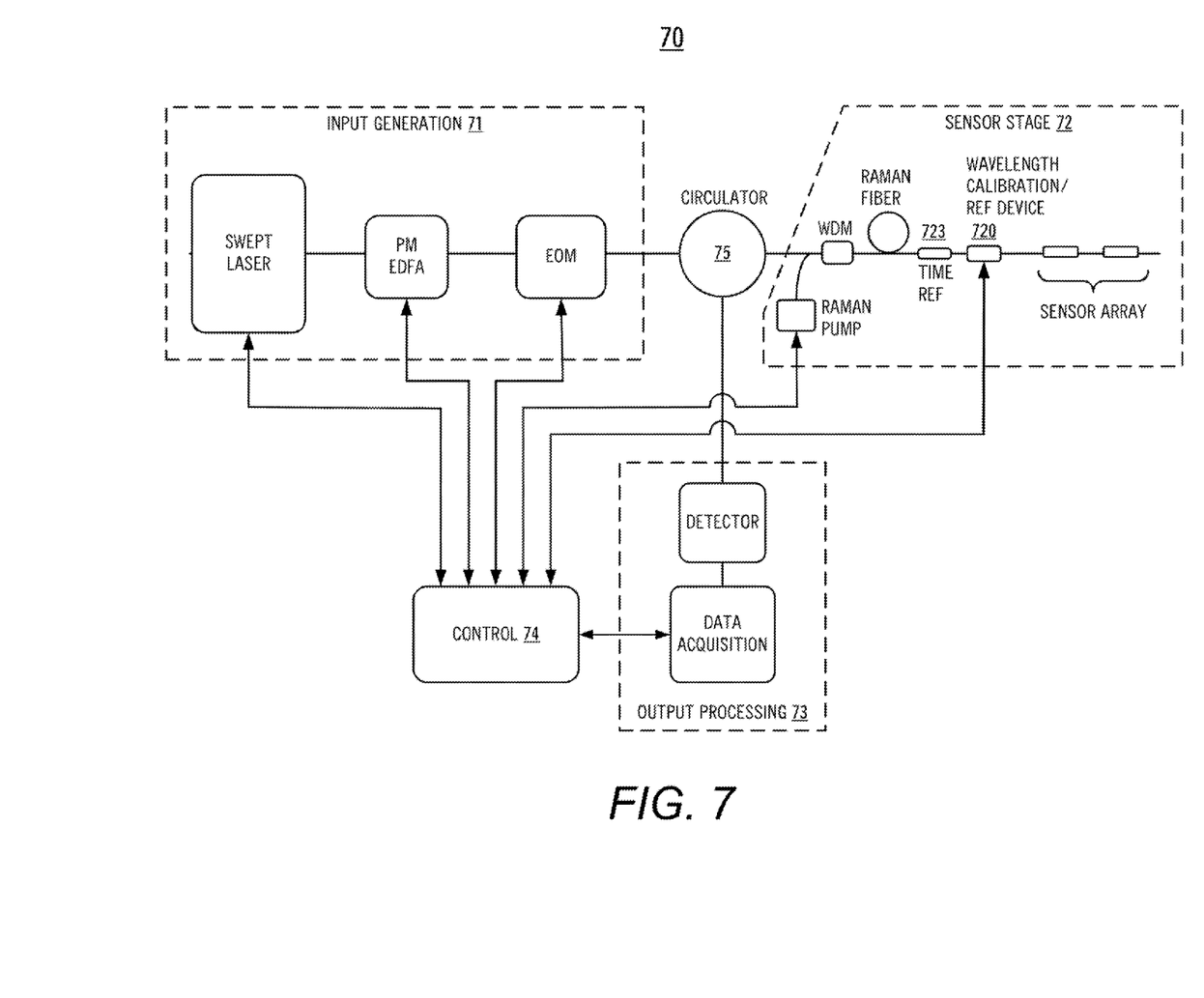

FIG. 7 shows a diagram of a system 70 embodying a variation of system 60 shown in FIG. 6. Input generation stage 71, sensor stage 72, output processing stage 73, control module 74, and circulator 75 are the same as their counterparts in system 60, with the exception of wavelength measurement module 614. In system 70, instead of performing the wavelength measurement right after the swept laser, the wavelength reference/calibration function is performed in the sensor stage 72 by inserting a wavelength reference device 720 after the time reference grating 723. According to a practice of the invention, the wavelength reference device 720 comprises a plurality of temperature-stabilized gratings with different wavelengths, covering the wavelength range of the sensor gratings.

It is noted that, with respect to the sensor gratings, a large number of suitable gratings can be fabricated through a write-through-coating fiber grating manufacture process. In this way, the mechanical strength of the grating fiber can be close to that of a pristine fiber. Thus, such an approach is highly suitable for applications requiring gratings with high mechanical strength. Further, employing a write-through coating fiber grating manufacturing technique allows the grating manufacturing process to be automated, thereby significantly reducing cost. Furthermore, automation will be enhanced by the fact that the sensor system measures the wavelength shifts for all the gratings relative to their original wavelengths. Thus, the initial wavelength tolerances for all the gratings can be very loose.

Since these gratings are weak in reflectivity, the draw tower single UV pulse grating process is also very suitable for fabricating FBG arrays for this type of system. If both strain and temperature measurements are required, a twin-core write-through coating grating array may be manufactured and arranged for this purpose. The two gratings in the twin-core fiber have almost the same strain coefficients, but quite different temperature coefficients. In this way, two measurement equations can be solved accurately to obtain the strain and temperature measurements.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A fiber optic sensor system, comprising:
an input generator comprising a light source for emitting light covering a selected wavelength range, a rare-earth-doped fiber amplifier for amplifying the emitted light, and a modulator for modulating the emitted light to produce a series of light pulses;
a sensor stage coupled to the input generator for receiving the series of light pulses as an input, and for transmitting the light pulses through an array of sensor gratings positioned along an optical pathway, wherein the propagation of a pulse through the sensor array results in a time-domain-multiplexed output, comprising a series of output pulses in which each output pulse comprises a reflection of the input pulse at a respective grating in the sensor array,
wherein the sensor stage comprises a Raman amplification means for amplifying both the input into the sensor array and the time-domain multiplexed output coming out of the sensor array;
an output processing stage for detecting the output out of the sensor array and for reconstructing the wavelength output of each grating in the sensor array; and
a control module for operating the system stages,
wherein the sensor array comprises a first group and a second group of gratings, each of the first and second groups comprising hundreds of individual gratings at designated locations along a single optical fiber pathway, wherein the individual gratings are separated from each other by a distance of at least one meter,
wherein the first group of gratings is characterized by a first Bragg wavelength, and where the second group of gratings is characterized by a second Bragg wavelength that is different from the first Bragg wavelength,
whereby the sensor array output comprises a series of pulses in which individual outputs from individual gratings are identified by arrival time and by wavelength.

2. The fiber optic system of claim 1, wherein the rare-earth-doped fiber amplifier comprises an erbium-doped fiber amplifier.

3. The fiber optic system of claim 1, wherein the input generator stage, the sensor stage, and the output processing stage are coupled to each other by means of an optical circulator, whereby light emitted by the input generator stage is coupled into the sensor stage, and the output of the sensor stage is coupled into the output processing stage.

4. The fiber optic system of claim 1, wherein the sensor stage further comprises a time reference grating connected upstream of the sensor array that is configured to provide a time reference signal for use by the control module as a baseline time in reconstructing the output of each grating in the sensor array.

5. The fiber optic system of claim 1, wherein at least a portion of the optical fiber pathway in the sensor stage is fabricated from a Raman-active optical fiber, such that some Raman amplification takes place therein.

6. The fiber optic system of claim 1, wherein the groups of gratings are arranged in a non-overlapping configuration.

7. The fiber optic system of claim 1, wherein individual gratings from different groups are arranged in an overlapping configuration, such that the distance between at least some gratings with the same wavelength can exceed a required distance between adjacent sensing points.

8. The fiber optic system of claim 1, wherein the light source comprises an amplified spontaneous emission from an erbium-doped fiber.

9. The fiber optic system of claim 8, wherein the output processing stage comprises wavelength-spreading means for spreading apart the wavelength components of the output from the sensor stage, and a detector for digitizing the output after wavelength spreading.

10. The fiber optic system of claim 9, wherein the wavelength-spreading means comprises a blazed grating and prism assembly.

11. The fiber optic system of claim 9, wherein the output processing stage further includes a calibrated scanning stage for accurately deriving wavelength data for the sensor output.

12. The fiber optic system of claim 1, wherein the light source comprises a tunable laser.

13. A fiber optic system of claim 12, wherein the output processing stage is configured to derive wavelength data from the sensor output in relationship to the instantaneous wavelength of the tunable laser output.

14. The fiber optic system of claim 13, wherein the output processing stage is configured to use the laser setting for the instantaneous wavelength of the tunable laser output.

15. The fiber optic system of claim 1, wherein the light source comprises a swept laser.

16. The fiber optic system of claim 15, wherein the input generation stage comprises a wavelength measurement module for measuring the instantaneous wavelength of the swept laser output for use by the output processing stage in deriving wavelength data from the sensor array output.

17. The fiber optic system of claim 15, wherein the sensor stage comprises a wavelength reference device connected between the time reference grating and the sensor array for calibrating the sensor array output.

18. The fiber optic system of claim 17, wherein the wavelength reference device comprises a plurality of temperature-stabilized gratings with different wavelengths, covering the wavelength range of the sensor gratings.

* * * * *